United States Patent
Richards et al.

(10) Patent No.: US 10,909,364 B2
(45) Date of Patent: Feb. 2, 2021

(54) UNCOOLED GAS IMAGING CAMERA

(71) Applicant: FLIR Systems, Inc., Wilsonville, OR (US)

(72) Inventors: Austin A. Richards, Santa Barbara, CA (US); Nicholas Högasten, Santa Barbara, CA (US)

(73) Assignee: FLIR SYSTEMS, INC., Wilsonville, OR (US)

(*) Notice: Subject to any disclaimer, the term of this patent is extended or adjusted under 35 U.S.C. 154(b) by 0 days.

(21) Appl. No.: 15/990,343

(22) Filed: May 25, 2018

(65) Prior Publication Data

US 2018/0276469 A1    Sep. 27, 2018

Related U.S. Application Data

(63) Continuation of application No. PCT/US2016/064808, filed on Dec. 2, 2016.
(Continued)

(51) Int. Cl.
*H04N 7/18*        (2006.01)
*G06K 9/00*        (2006.01)
(Continued)

(52) U.S. Cl.
CPC ........ *G06K 9/00624* (2013.01); *G01J 3/2823* (2013.01); *G01J 5/0014* (2013.01);
(Continued)

(58) Field of Classification Search
CPC .. G06K 9/00624; G01J 3/2823; G01J 5/0014; G01J 2003/2826; G01M 3/002;
(Continued)

(56) References Cited

U.S. PATENT DOCUMENTS 5,479,258 A    12/1995    Hinnrichs et al.
5,867,264 A    2/1999    Hinnrichs
(Continued)

FOREIGN PATENT DOCUMENTS

EP    0930496        7/1999
EP    1595492 A1 *  11/2005    ................ G01J 3/10
WO    WO 2009/087614    7/2009

OTHER PUBLICATIONS

Damsky, Ben, "EPRI's $SF_6$ Management Program," EPA.com, [retrieved on Nov. 5, 2018], 7 Pages [online]. Retrieved from the Internet: <https://www.epa.gov/sites/production/files/2016-02/documents/conf00_damsky_paper.pdf>.
(Continued)

*Primary Examiner* — Peet Dhillon
(74) *Attorney, Agent, or Firm* — Haynes and Boone, LLP

(57) ABSTRACT

Various embodiments of the present disclosure may include an imaging system that includes a plurality of uncooled cameras configured to detect the presence of gas within a scene imaged. The plurality of cameras may include at least one broadband camera and at least one narrowband camera. The narrowband camera may include a filter or image data from the narrowband camera may be filtered to the band desired. The images captured by the broadband and narrowband cameras may be processed and/or analyzed to determine the presence of gas within the scene. An image may be generated incorporating the image data of the broadband and narrowband cameras and the presence of gas may be indicated within the image.

20 Claims, 9 Drawing Sheets

Related U.S. Application Data

(60) Provisional application No. 62/264,259, filed on Dec. 7, 2015.

(51) Int. Cl.

| | | |
|---|---|---|
| *G01N 21/3504* | (2014.01) | |
| *H04N 5/33* | (2006.01) | |
| *G01M 3/00* | (2006.01) | |
| *G01M 3/38* | (2006.01) | |
| *G01J 3/28* | (2006.01) | |
| *G06T 5/50* | (2006.01) | |
| *G06T 7/33* | (2017.01) | |
| *G01J 5/00* | (2006.01) | |
| *G01J 5/20* | (2006.01) | |
| *G06T 5/00* | (2006.01) | |
| *H04N 5/247* | (2006.01) | |
| *G01J 3/02* | (2006.01) | |

(52) U.S. Cl.
CPC ............... *G01J 5/20* (2013.01); *G01M 3/002* (2013.01); *G01M 3/38* (2013.01); *G01N 21/3504* (2013.01); *G06T 5/009* (2013.01); *G06T 5/50* (2013.01); *G06T 7/33* (2017.01); *H04N 5/247* (2013.01); *H04N 5/33* (2013.01); *H04N 5/332* (2013.01); *G01J 3/0289* (2013.01); *G01J 2003/2806* (2013.01); *G01J 2003/2826* (2013.01); *G01N 2021/3531* (2013.01)

(58) Field of Classification Search
CPC ............... G01M 3/38; G01N 21/3504; G01N 2021/3531; G06T 5/009; G06T 5/50; G06T 7/33; H04N 5/247; H04N 5/33; H04N 5/332
See application file for complete search history.

(56) References Cited

U.S. PATENT DOCUMENTS

| | | | |
|---|---|---|---|
| 6,680,778 B2 | 1/2004 | Hinnrichs et al. | |
| 2003/0025081 A1 | 2/2003 | Edner et al. | |
| 2005/0249377 A1* | 11/2005 | Fouquet | G01J 3/10 382/103 |
| 2006/0091310 A1* | 5/2006 | Furry | G01N 21/3518 250/330 |
| 2008/0144972 A1* | 6/2008 | Kang | G06K 9/6211 382/294 |
| 2008/0156991 A1* | 7/2008 | Hu | G01N 21/3151 250/341.1 |
| 2009/0065666 A1* | 3/2009 | Maningo | F16M 11/10 248/178.1 |
| 2012/0314080 A1 | 12/2012 | Lee et al. | |
| 2013/0286213 A1 | 10/2013 | Cetin et al. | |
| 2014/0139643 A1* | 5/2014 | Hogasten | H04N 5/33 348/48 |
| 2017/0089761 A1* | 3/2017 | McQuilkin | G01J 3/0272 |

OTHER PUBLICATIONS

"EPRI GasVue Camera Sparks Recommended SF$_6$ Procedure at NYPA," Electric Power Research Institute (EPRI), Mar. 2001, 2 Pages. Retrieved from the Internet: <https://www.epri.com/#/pages/product/000000000001000063/?lang=en-US>.

"GCI Camera," Rebellion Photonics, [retrieved on Nov. 5, 2018], 3 Pages [online]. Retrieved from the Internet: <http://rebellionphotonics.com/gci-camera.html>.

"How to pinpoint SF6 leaks quickly without the need to de-energise," Modern Power Systems, [retrieved on Nov. 5, 2018], 2 Pages [online]. Retrieved from the Internet: <https://www.modernpowersystems.com/features/featurehow-to-pinpoint-sf-sub-6-sub-leaks-quickly-without-the-need-to-de-energise/>.

"Sherlock® SF6 Remote SF6 Gas Leak Imaging & Quantification," GIT Gas Imaging Technology, LLC, [retrieved on Nov. 5, 2018], 2 Pages [online]. Retrieved from the Internet: <http://www.gitint.com/pdfs/SherlockSF6 Product Brochure 09-v1.pdf>.

\* cited by examiner

UNCOOLED GAS IMAGING CAMERA

CROSS-REFERENCE TO RELATED APPLICATIONS

This application is a continuation of International Patent Application No. PCT/US2016/064808 filed Dec. 2, 2016 and entitled "UNCOOLED GAS IMAGING CAMERA," which is incorporated herein by reference in its entirety International Patent Application No. PCT/US2016/064808 filed Dec. 2, 2016 claims priority to and the benefit of U.S. Provisional Patent Application No. 62/264,259 filed Dec. 7, 2015 and entitled "UNCOOLED GAS IMAGING CAMERA" which is hereby incorporated by reference in its entirety.

TECHNICAL FIELD

One or more embodiments of the invention relate generally to imaging devices and more particularly to, for example, uncooled gas imaging cameras.

BACKGROUND

Traditionally, gas imaging cameras are cooled. Such cooling equipment may be bulky and render the cameras extremely expensive. As a result, there is a need for a cost effective, uncooled, gas imaging camera and associated techniques.

SUMMARY

Systems and methods are disclosed herein for providing an uncooled gas imaging camera. In certain embodiments, an apparatus may be provided. The may include a first camera configured to acquire a plurality of first image frames of at least a first scene in a broad wavelength band and output first image data associated with the plurality of first image frames of at least the first scene, a second camera configured to acquire a plurality of second image frames of at least the first scene in a narrow wavelength band substantially simultaneous with the first camera and output second image data associated with the plurality of second image frames of at least the first scene, and a controller communicatively connected to the first camera and the second camera. The controller may be configured to analyze the first image data and the second image data to determine a presence of a gas within the first scene and generate, with the first image data and the second image data, an image comprising a broadband representation of the first scene and a gas presence indication.

In certain other embodiments, a method may be provided. The method may include acquiring first image data of a first scene in a broad wavelength band from a first camera, acquiring second image data of the first scene in a narrow wavelength band from a second camera, analyzing first image data and the second image data to determine a presence of a gas within the first scene, and generating, with the first image data and the second image data, an image comprising a broadband representation of the first scene and a gas presence indication.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Techniques and mechanisms are provided in accordance with one or more embodiments to image a presence of gas with uncooled cameras. Certain embodiments may include a plurality of cameras. The plurality of cameras may be calibrated to image and/or record the same scene. At least one of the plurality of cameras may be configured to obtain broadband images or broadband videos. A broadband image or video may be an image or video that includes a large spectrum of wavelengths. Additionally, at least one of the plurality of cameras may be configured to obtain narrowband images or narrowband videos.

A narrowband image may be an image or video that includes a narrow spectrum of wavelengths. For the purposes of this disclosure, a narrowband image or video may be image or video that includes a narrower spectrum of wavelengths than the spectrum of the broadband image or video. A controller communicatively coupled to the plurality of cameras may receive image data from the plurality of cameras. The controller may analyze the broadband and narrowband images to detect a presence of gas within the scene being imaged. The controller may render a representation of the scene and may also render an overlay indicating a presence of gas within the scene.

In certain embodiments, the uncooled gas imaging cameras described herein may offer benefits such as lower cost, smaller size and lighter weight, allow for thermal waste heat to be kept within an enclosure, longer battery life, better portability such as allowing the cameras to be handheld, easier exportability, quicker start-up time, and longer operating life as well as longer intervals between service.

In certain such embodiments, the uncooled gas imaging cameras may include a plurality of cameras. Including a plurality of cameras instead of a single camera may offer benefits such as allowing for the inclusion of a broadband camera that allows for a background scene or scene context to be imaged at the same or approximately the same time as that of a narrowband camera. The plurality of cameras allows for comparison of signals of between two sets of spatially registered image data acquired at the same or approximately the same time. The two sets of image data allows for the system to be operational under motion of the scene, motion of the camera system, or both. A single camera system is unable to operate under motion. Additionally, when temporal difference metrics are used, the high scene contrast of the broadband image allows for easier image registration and, accordingly, temporal image registration when the camera and/or the scene is in motion. Also, a plurality of cameras provides higher immunity to selective radiators (e.g., non-grey body background scenes that may be slightly lower in radiance in the on-peak band imaged by the narrowband camera as powered to off-peak band(s)).

Figure 1A:
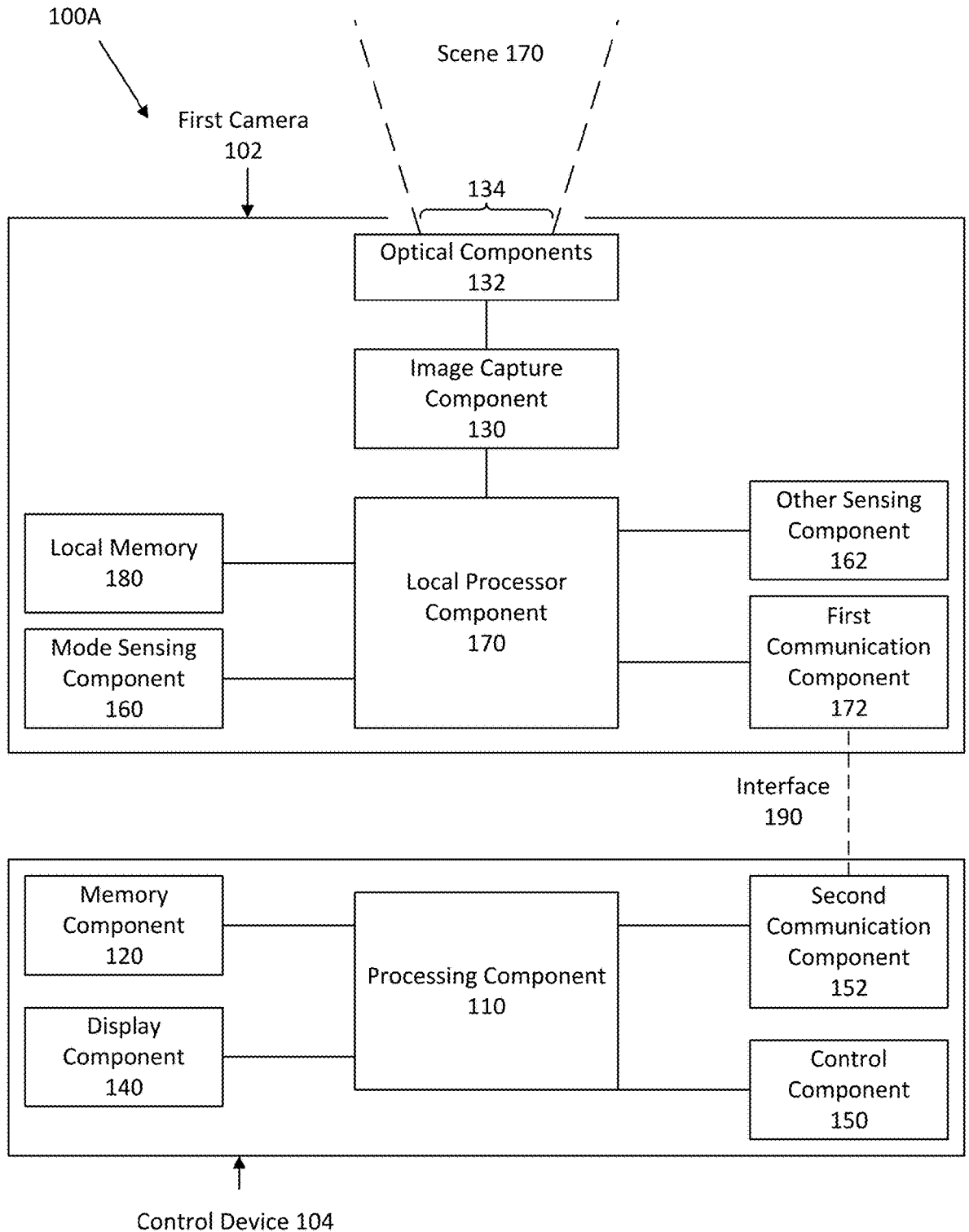
FIG. 1A illustrates a block diagram of an imaging system in accordance with an embodiment of the disclosure.

FIG. 1A illustrates a block diagram of an imaging system in accordance with an embodiment of the disclosure. Imaging system 100A in FIG. 1A may be used to capture and process image frames in accordance with various techniques described herein.

Imaging system 100A includes components distributed over multiple devices. In particular, imaging system 100A includes a first camera 102 (a transmitting device) and a control device 104 (a receiving device) in communication with the first camera 102. Other embodiments may distribute the components to devices in other ways and may, in addition, distribute the components to three or more devices. Some such embodiments may distribute one, some, or all of the components of imaging system 100A over the cloud. Thus, in those embodiments, image processing may be performed over the cloud, using one or multiple cloud devices, by sending image data over the cloud. Once the image has been processed, the image may be displayed or stored via an internet service (such as on YouTube®, Dropbox®, Google Drive®, etc.) or sent back to a user device and displayed or stored on the user device. In various embodiments, either the first camera 102 and/or the control device 104 may be a camera, a camera suite, a sensor suite, a smartphone, a computer, a server, a tablet, or another type of electronic device.

In certain embodiments, the first camera 102 and the control device 104 may be coupled together. That is, the first camera 102 may be a camera attachment that may be fitted or communicatively connected (e.g., via Bluetooth) to the control device 104. The control device 104 may run an application that performs at least a portion of an image processing procedure. In such an embodiment, the control device 104 may be a smartphone, a tablet, a computer, or another type of electronic device that may receive the camera attachment. In certain embodiments, the camera attachment may be fitted via connectors such as USB or Lightning Cable connectors. Other embodiments may connect the first camera 102 and the control device 104 through a network connection, such as via Bluetooth, the internet, Near Field Communications ("NFC"), Local Area Network ("LAN"), or other network connections.

In one embodiment, the first camera 102 includes a local processor component 170, a local memory 180, an image capture component 130, optical components 132, a first communication component 172, a mode sensing component 160, and an other sensing component 162. The control device 104 may include a processing component 110, a memory component 120, a display component 140, a second communication component 152, and a control component 150.

In various embodiments, the first camera 102 may be implemented as an imaging device, such as a camera, to capture image frames of, for example, a scene 170 (e.g., a field of view). The first camera 102 may represent any type of camera which, for example, detects electromagnetic radiation (e.g., irradiance) and provides representative data (e.g., one or more still image frames or video image frames). For example, the first camera 102 may represent a camera that is directed to detect one or more ranges (e.g., wavebands) of electromagnetic radiation and provide associated image data. Imaging system 100A may include a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, the first camera 102 may be integrated as part of a non-mobile installation to provide image frames to be stored and/or displayed.

The local processor component 170 and/or the processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or or any other appropriate combination of processing device and/or memory to execute instructions to perform any of the various operations described herein. The local processor component 170 may be adapted to interface and communicate with components 130, 160, 162, 172, and 180 to perform method and processing steps as described herein. The processing component 110 may be adapted to interface and communicate with components 120, 140, 150, and 152.

Additionally, the local processor component 170 may be adapted to receive image signals from image capture component 130, process image signals (e.g., to provide processed image data), store image signals or image data in local memory 180, and/or retrieve stored image signals from local memory 180. Certain embodiments of the first camera 102 may include a plurality of image capture components. Such embodiments may capture multiple scenes and the local processor component 170 and/or the processing component 110 may then create a composite image out of the multiple scenes captured by the plurality of image capture components. The local processor component 170 may also communicate data, via the device communication component 172, to the control device 104. The device communication component 172 may communicate with the control device 104 via an interface 190 established between the device communication component 172 and a communication component 152 of the first camera 102. In various embodiments, the interface 190 may be a Bluetooth link, a WiFi link, a NFC link, a wired connection, or another type of link between the first camera 102 and the control device 104. In certain embodiments, the interface 190 may be a low bitrate interface. For the purposes of this disclosure, a "low bitrate interface" may be any interface that would not transfer data at a high enough rate to allow smooth real-time showing or streaming on a receiving device. Accordingly, as video definitions increase, the speed of what is considered a "low bitrate interface" may increase as well. Additionally, certain such interfaces may be limited in the amount of dynamic range that the interfaces can transfer due to the interfaces themselves or software used to process videos. For example, certain commercially available video encoders, video compressors, and display drivers may require frames to have only 8 or 10 bits of dynamic range (for example, 8 bits of luminance dynamic range). As the software used to process the videos are part of the process of transferring the video data, such software may also be considered as part of the "low bitrate interface". Certain hardware components such as the physical interfaces may also be limited to a maximum number of bits per sample. For example, parallel data interfaces may only have 8 pins on a connector or there may be 10 input pins on a serializer (parallel to serial converter).

In other embodiments, the interface 190 may have available bandwidth that may allow the first camera 102 to communicate images or video to the control device 104 in high dynamic range. However, in such embodiments, low bitrate communication may still be desirable as transferring via low bitrate may allow additional devices to share the interface 190.

The local memory 180 and/or the memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 and/or the local processor component 170 is adapted to execute software stored in the memory component 120 and/or the local memory 180, respectively, to perform various methods, processes, and modes of operations in manner as described herein.

Image capture component 130 includes, in one embodiment, one or more sensors (e.g., any type visible light, infrared, or other type of detector, including a detector implemented as part of a focal plane array) for capturing image signals representative of an image, of scene 170. In one embodiment, the sensors of image capture component 130 (e.g., an infrared sensor) provide for representing (e.g., converting) a captured thermal or radiometric image signal of scene 170 as digital data (e.g., via an analog-to-digital converter included as part of the sensor or separate from the sensor as part of imaging system 100A). The image capture component 130 may capture high dynamic range radiometric thermal images or videos. The image capture component 130 may be, for example, a bolometer based imaging apparatus (e.g., the image capture component 130 may be an array of sensors).

Optical components 132 may include one or more lenses configured to receive electromagnetic radiation through an aperture 134 in housing 101 and pass the electromagnetic radiation to image capture component 130. Additionally, optical components 132 may include one or more filters (e.g., warm filters, bandpass filters, low pass filters, high pass filters, notch filters, and/or other optical filters) to filter electromagnetic radiation before the radiation reaches the image capture component 130. In certain other embodiments, alternatively or in addition to filters located in front of the electromagnetic radiation, processing component 110 may be configured to filter images captured by the image capture component 130 with, for example, software within processing component 110. In certain other embodiments, the optical filters (e.g., warm filters, bandpass filters, low pass filters, high pass filters, notch filters, and/or other optical filters) may be integrated within the image capture component 130. For embodiments where the image capture component 130 is an array, the optical filters may be integrated within each sensor of the array and/or integrated as one or more optical filters covering a plurality of sensors.

The local processor component 170 or the processing component 110 (via the interface 190) may be adapted to receive image signals from the image capture component 130, process image signals (e.g., to provide processed image data), store image signals or image data in the local memory 180 or the memory component 120, and/or retrieve stored image signals from the respective memories. Image data, either high dynamic range image data or low dynamic range image data, may be transferred between the first camera 102 and the control device 104 between the interface 190. In certain embodiments, the image data transferred may be compressed image data. Processing component 110 may be adapted to process image signals received to provide image data (e.g., reconstructed image data) to the display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140 that the processing component 110 retrieved from the memory component 120, processed from image data received via the interface 190, or processed from any other source. Display component 140 may include display electronics, which may be utilized by processing component 110 to display image data and information. Display component 140 may receive image data and information directly from image capture component 130 via the interface 190, from the local processor component 170 via the interface 190, or the image data and information may be transferred from memory component 120.

In various aspects, display component 140 may be remotely positioned (e.g., housed in a separate housing) from the image capture component 130, and processing component 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, it should be appreciated that the control panel unit may be adapted to include one or more other user-activated mechanisms to provide various other control operations of imaging system 100A, such as auto-focus, menu enable and selection, field of view (FoV), brightness, contrast, gain, offset, spatial, temporal, and/or various other features and/or parameters. In other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

In certain embodiments, the first camera 102 may include the control component 150 and/or the display component 140 instead of or in addition to the control device 104. It is appreciated that the various components described herein may be included on either or both of the first camera 102 and the control device 104.

Mode sensing component 160 includes, in one embodiment, an application sensor adapted to automatically sense a mode of operation, depending on the sensed application (e.g., intended use or implementation), and provide related information to the local processor component 170 and/or the processing component 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electro-mechanical triggering mechanism, an electro-magnetic triggering mechanism, or some combination thereof. For example for one or more embodiments, mode sensing component 160 senses a mode of operation corresponding to the imaging system 100A's intended application based on the type of mount (e.g., accessory or fixture) to which a user has coupled the imaging system 100A (e.g., image capture component 130). Alternatively, the mode of operation may be provided via control component 150 by a user of imaging system 100A (e.g., wirelessly via display component 140 having a touch screen or other user input representing control component 150).

Furthermore, in accordance with one or more embodiments, a default mode of operation may be provided, such as for example when mode sensing component 160 does not sense a particular mode of operation (e.g., no mount sensed or user selection provided). For example, imaging system 100A may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the imaging system 100A to a vehicle or part thereof and may include a sensor adapted to provide a sensing signal to processing component 110 when the imaging system 100A is mounted and/or secured to the vehicle. Mode sensing component 160, in one embodiment, may be adapted to receive an electrical signal and/or sense an electrical connection type and/or mechanical mount type and provide a sensing signal to processing component 110. Alternatively or in addition, as discussed herein for one or more embodiments, a user may provide a user input via control component 150 (e.g., a wireless touch screen of display component 140) to designate the desired mode (e.g., application) of imaging system 100A.

Processing component 110 and/or local processor component 170 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging system 100A). In certain embodiments, a component may communicate with another component via the interface 190.

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, mode sensing component 160 may include communication devices that relay information to processing component 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100A may include one or more other types of sensing components 162, including environmental and/or operational sensors, depending on the sensed application or implementation, which provide information to processing component 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 162 may include one or more conventional sensors as would be known by those skilled in the art for monitoring various conditions (e.g., environmental conditions) that may have an effect (e.g., on the image appearance) on the data provided by image capture component 130. The other sensing components 162 may be located on the first camera 102, as shown in FIG. 1A, on the control device 104, on both the first camera 102 and the control device 104, or, alternatively or additionally, on another device separate from the first camera 102 and the control device 104.

In some embodiments, other sensing components 162 may include devices that relay information to processing component 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of imaging system 100A may be combined and/or implemented or not, as desired or depending on application requirements, with imaging system 100A representing various operational blocks of a system. For example, processing component 110 may be combined with memory component 120, image capture component 130, display component 140, and/or mode sensing component 160. In another example, processing component 110 may be combined with image capture component 130 with only certain operations of processing component 110 performed by circuitry (e.g., a processor, a microprocessor, a microcontroller, a logic device, or other circuitry) within image capture component 130. In still another example, control component 150 may be combined with one or more other components or be remotely connected to at least one other component, such as processing component 110, via a wired or wireless control device so as to provide control signals thereto.

In one embodiment, communication component 152 and/or device communication component 172 may be implemented as a network interface component (NIC) adapted for communication with a network including other devices in the network. In various embodiments, communication component 152 and/or device communication component 172 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 and/or device communication component 172 may include an antenna coupled thereto for wireless communication purposes. In other embodiments, the communication component 152 and/or device communication component 172 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network. The communication component 172 communication component 152 may send radiometric thermal images or video over the interface 190 to the communication component 152.

Figure 1B:
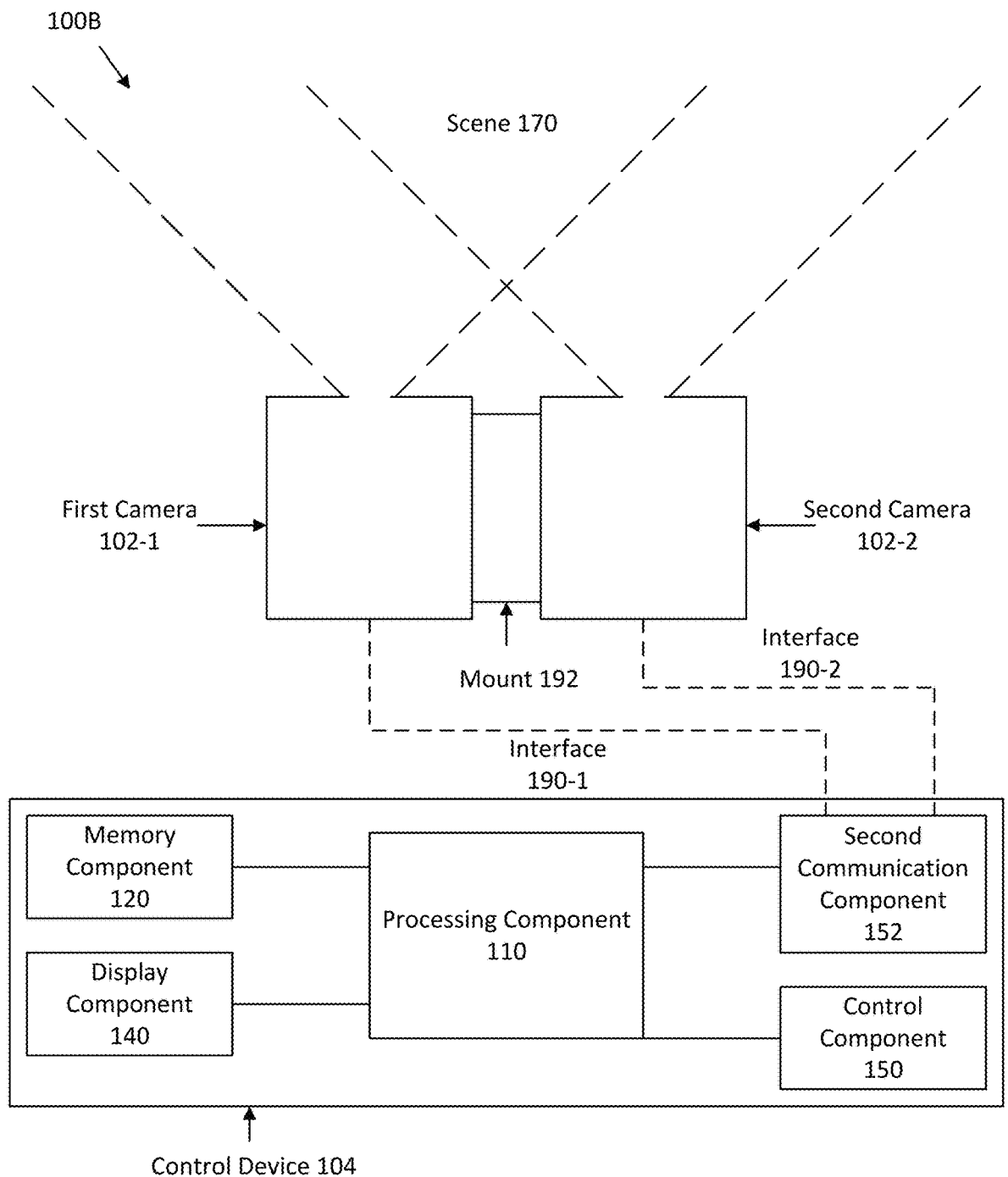
FIG. 1B illustrates a block diagram of an uncooled dual camera gas imaging system in accordance with an embodiment of the disclosure.

FIG. 1B illustrates a block diagram of an uncooled dual camera gas imaging system in accordance with an embodiment of the disclosure. The uncooled gas imaging system 100B of FIG. 1B may be a dual camera imaging system that includes a first camera 102-1, a second camera 102-2, and a control device 104. The control device 104 of FIG. 1B may be similar to the control device of FIG. 1A. However, in the embodiment shown in FIG. 1B, the second communication component 152 may be linked to both the first camera 102-1 and the second camera 102-2 via interfaces 190-1 and 190-2, respectively.

The first camera 102-1 may be, for example, a camera configured to obtain broadband images or videos. The first camera 102-1 may be a bolometer based camera or any other appropriate camera and/or may be an uncooled camera.

The second camera 102-2 may be, for example, a camera configured to obtain narrowband images or videos. The second camera 102-2 may be configured to obtain images within a narrow wavelength band and the narrow wavelength band may correspond to a wavelength emitted or absorbed by a gas that the imaging system 100B is configured to image. The second camera 102-2 may include a bandpass filter and/or other optical filter that filters images to pass a wavelength band that includes one of more of the wavelengths emitted or absorbed by the gas (e.g., if the gas emits or absorbs one or more wavelengths and 10.6 µm is one of the wavelengths, the bandpass filter may be configured to, for example, allow wavelengths of 10.4-10.8 µm to pass through). Certain gases may absorb a plurality of wavelengths and, in such instances, one or more of the wavelengths may be selected as the wavelength of interest. In other embodiments, the second camera 102-2 may not include a filter, but the control device 104 may be configured to filter image data generated by the second camera 102-2. In certain embodiments, the second camera 102-2 may also be a bolometer based camera or any other appropriate camera and/or the second camera 102-2 may also be an uncooled camera.

The first camera 102-1 and the second camera 102-2 may be coupled to a mount 192. The mount 192 may hold the first camera 102-1 and the second camera 102-2 in a fixed relation (e.g., a fixed distance) from each other. The mount 192 may be a rigid structure and may be used to control the distance between the first camera 102-1 and the second camera 102-2.

In certain embodiments, the first camera 102-1 and the second camera 102-2 may be synchronized. For example, the boresights of the first camera 102-1 and the second camera 102-2 may be aligned. In certain such embodiments, the first camera 102-1 and the second camera 102-2 may be boresighted to infinity through the use of an aligning device such as a collimator or another suitable aligning device. In addition, such embodiments or other embodiments may perform image registration to align pixels from the first camera 102-1 to pixels of the second camera 102-2 that image the same area of the scene 170. In order to perform image registration, at least a portion of the image obtained by the first camera 102-1 must also be obtained by the second camera 102-2. The first camera 102-1 and the second camera 102-2 may acquire image data (e.g., images and/or video) simultaneously or substantially simultaneously (e.g., during the same period, though the frames of, for example, video recorded by the broadband and narrowband cameras may not be recorded at precisely the same period). The image data may then be outputted to the control device 104 for processing. Processing of the image data may be described in further detail in FIG. 5.

Figure 1C:
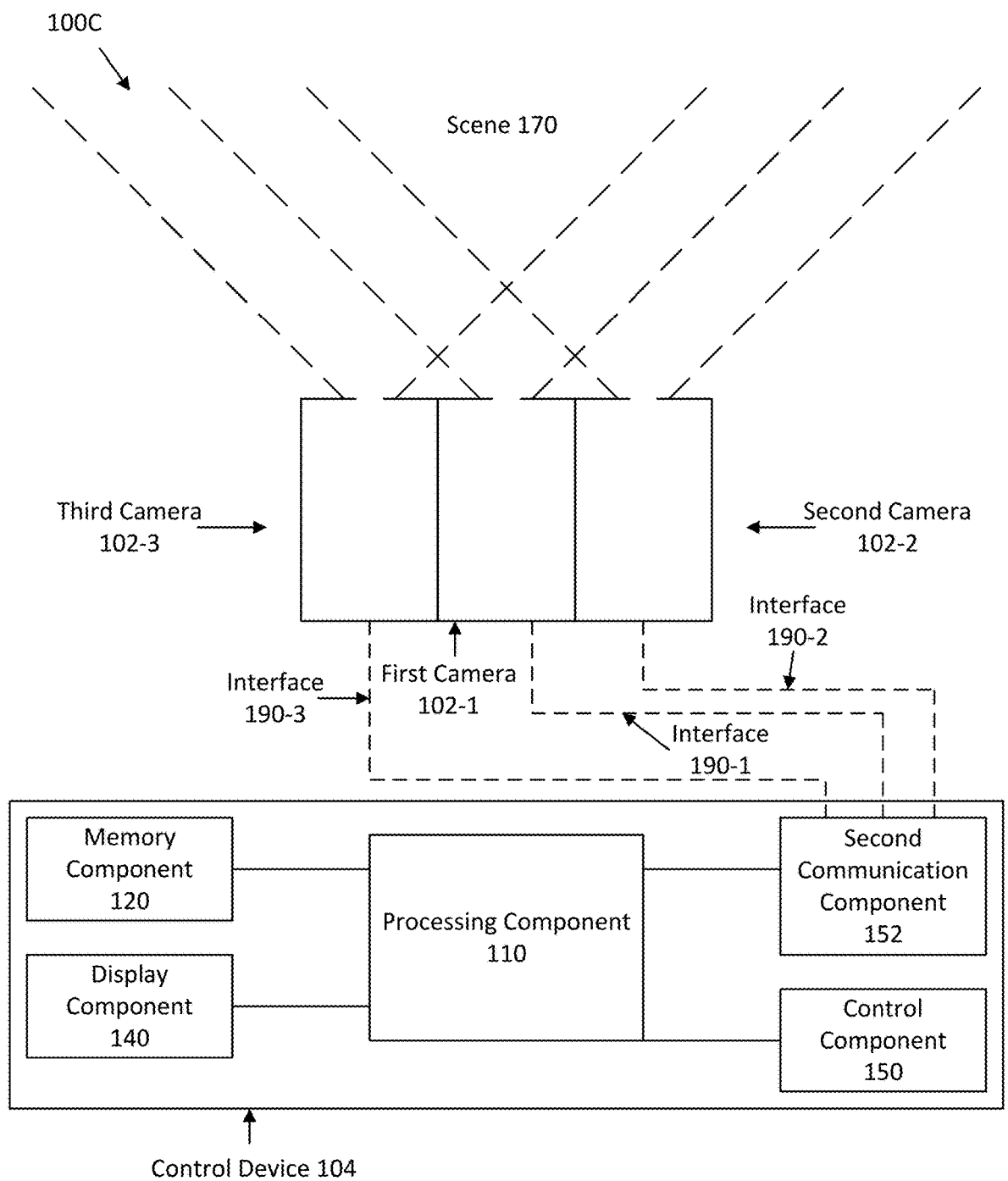
FIG. 1C illustrates a block diagram of an uncooled triple camera gas imaging system in accordance with an embodiment of the disclosure.

FIG. 1C illustrates a block diagram of an uncooled triple camera gas imaging system in accordance with an embodiment of the disclosure. The uncooled gas imaging system 100C of FIG. 1C may be a triple camera imaging system that includes a first camera 102-1, a second camera 102-2, a third camera 102-3, and a control device 104. The control device 104 of FIG. 1C may be similar to the control devices of FIGS. 1A and 1B. However, in the embodiment shown in FIG. 1C, the second communication component 152 may be linked to all three of the first camera 102-1 the second camera 102-2, and the third camera 102-3 via interfaces 190-1, 190-2, and 190-3, respectively. While the embodiment shown in FIG. 1C includes three cameras, other embodiments may include any number of a plurality of cameras such as four cameras, five cameras, or six or more cameras.

In FIG. 1C, the first camera 102-1 may be, for example, a camera configured to obtain broadband images or videos. The second camera 102-2 and the third camera 102-3 may be, for example, cameras configured to obtain narrowband images or videos. In certain embodiments, the electromagnetic spectrum obtained by the second camera 102-2 and the third camera 102-3 may be different electromagnetic spectrums. In certain such embodiments, one of the second or third cameras may be configured to capture images based on a narrow wavelength band centered on a wavelength emitted or absorbed by a gas and the other of the second or third cameras may be configured to obtain images within a narrow wavelength band centered above or below the wavelength emitted or absorbed by the gas (e.g., off-centered from the wavelength emitted or absorbed by the gas). In another embodiment, one of the second or third cameras may be configured to obtain electromagnetic radiation associated with the scene 170 and output signals associated with radiation within a narrow wavelength band extending below the wavelength emitted or absorbed by a gas. The other of the second or third cameras may be configured to obtain electromagnetic radiation associated with the scene 170 and output signals associated with radiation within a narrow wavelength band extending above the wavelength emitted or absorbed by the gas. The narrow wavelength bands off-centered from the wavelength emitted or absorbed by the gas may be wavelength bands very close to the wavelength emitted or absorbed by the gas (e.g., at least a portion of the band may be within less than approximately 0.05 µm, within between approximately 0.05 to 0.3 µm, within between approximately 0.3 to 0.5 µm, and within more than approximately 0.5 µm from the wavelength emitted or absorbed by the gas). The second and third cameras of certain embodiments may be configured to obtain images in narrow wavelength bands that overlap each other or the wavelength emitted or absorbed by the gas. In such embodiments, the wavelength band of one of the cameras may be a band with at least a portion of the band lower or higher than the wavelength band of the other camera. Embodiments where at least one of the second and third cameras obtain images in wavelength bands extending slightly above and/or below the wavelength of the gas may allow more accurate determination of the presence of gas. In certain situations, a scene may coincidentally reflect light at the wavelength of the gas, which may lead to false positives in determining the presence of gas within the scene. However, with at least one of the two cameras configured to obtain images in wavelength bands extending slightly above and/or below the wavelength of the gas, occurrences of false positives may be minimized. Minimization of false positives may be performed by, for example, analyzing signals from the two cameras. If both wavelength bands imaged by the two cameras see increases or relatively large increases, then the likelihood of a false positive, such as, for example, an object that reflects light at the wavelengths of both bands, being within the image is statistically much larger.

The second and/or third cameras 102-2 and/or 3 may include bandpass filters that filters images. In certain embodiments, the second and/or third cameras 102-2 and/or 3 may also be a bolometer based cameras or any other appropriate cameras. In certain embodiments, the second and/or third cameras 102-2 and/or 3 may also be uncooled cameras.

In certain embodiments, the first camera 102-1, the second camera 102-2, and/or the third camera 102-3 may be synchronized. For example, the boresights of the first, second, and third cameras 102-1 to 102-3 may be aligned by, for example, boresighting to infinity through the use of a collimator or another suitable aligning device. In addition, such embodiments or other embodiments may perform image registration to align the pixels of the first camera 102-1, the second camera 102-2, and/or the third camera 102-3, as well as any other cameras. The first, second, and third cameras 102-1 to 102-3 may acquire image data simultaneously or substantially simultaneously. The image data may then be outputted to the control device 104 for processing.

Figure 2:
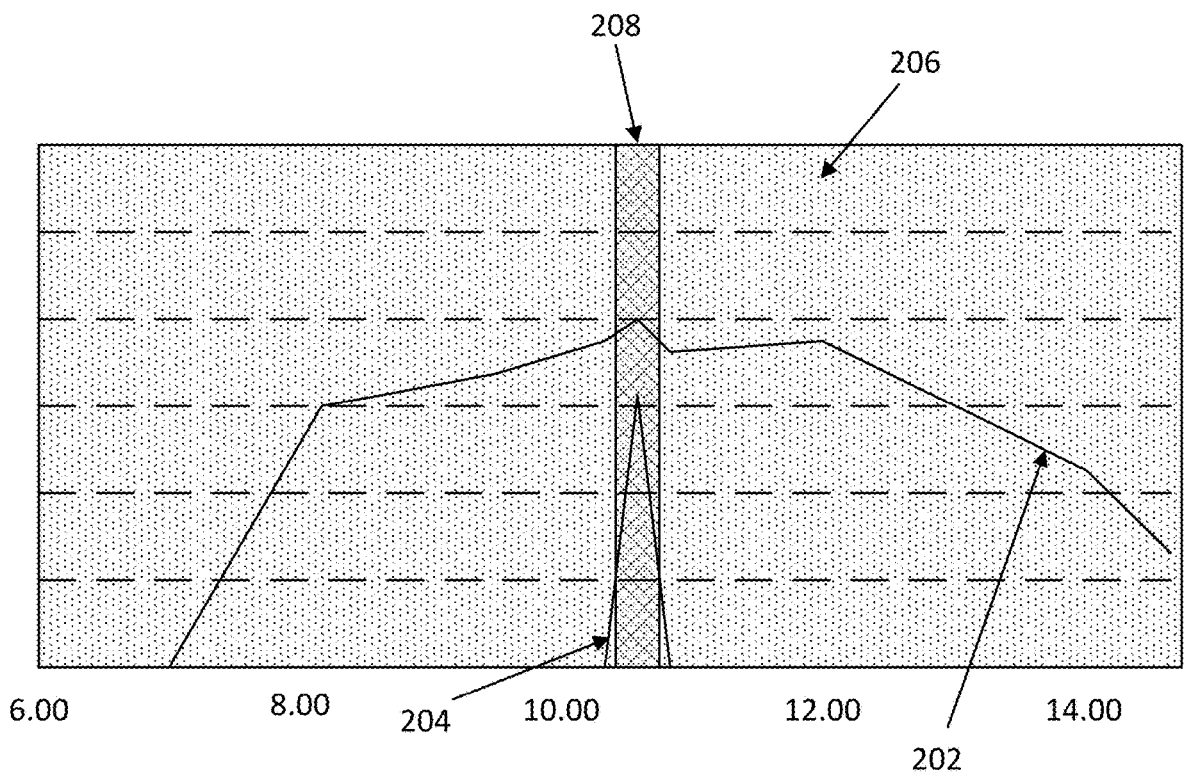
FIG. 2 illustrates a graph of radiance of an example scene acquired by an uncooled dual camera imaging system in accordance with an embodiment of the disclosure.

FIG. 2 illustrates a graph of radiance of an example scene acquired by an uncooled dual camera imaging system in accordance with an embodiment of the disclosure. In FIG. 2, the x-axis corresponds to wavelengths, in µm, of an electromagnetic spectrum. The y-axis corresponds to an intensity of radiation emitted or absorbed for the wavelength. The line 202 of FIG. 2 is an example of a line showing a distribution of an electromagnetic spectrum emitted or absorbed by a scene. The line 204 is an example of a line showing a distribution of an electromagnetic spectrum emitted or absorbed by a gas within the scene. In the example shown in FIG. 2, the gas may emit or absorb electromagnetic radiation at and around a wavelength of 10.6 µm (and may be, for example, sulfur hexafluoride, acetyl chloride, acetic acid, allyl bromide, allyl chloride, allyl fluoride, ammonia, bromomethane, chlorine dioxide, ethyl cyanoacrylate, ethylene, furan, hydrazine, methylsilane, methyl ethyl ketone, methyl vinyl ketone, propenal, propene, tetrahydrofuran, trichloroethylene, uranyl fluoride, vinyl chloride, vinyl cyanide, and/or vinyl ether), though other examples and/or embodiments may be configured to detect gas that may emit or absorb electromagnetic radiation at other wavelengths (e.g., in thermal infrared wavelengths). In certain embodiments, the uncooled gas imaging cameras may be appropriate for detecting, for example, SF6 (sulfur hexafluoride) gas.

Area 206 may represent a range of an electromagnetic spectrum that a broadband camera of the imaging system disclosed herein may be configured to image. As shown, the broadband camera may image a wide range of the electromagnetic spectrum.

Area 208 may represent a range of an electromagnetic spectrum that a narrowband camera of the imaging system disclosed herein may be configured to image. As shown in FIG. 2, the narrowband camera may image a narrower range of the electromagnetic spectrum than the broadband camera. The narrowband range may be centered on the wavelength of a gas being imaged, such as, for example, a gas having an absorption and/or emission band at and/or around 10.6 µm wavelength as described herein, to detect the presence of the gas. Accordingly, the narrowband imaging system described in FIG. 2 may be a dual camera imaging system, as described in FIG. 1B.

Figure 3:
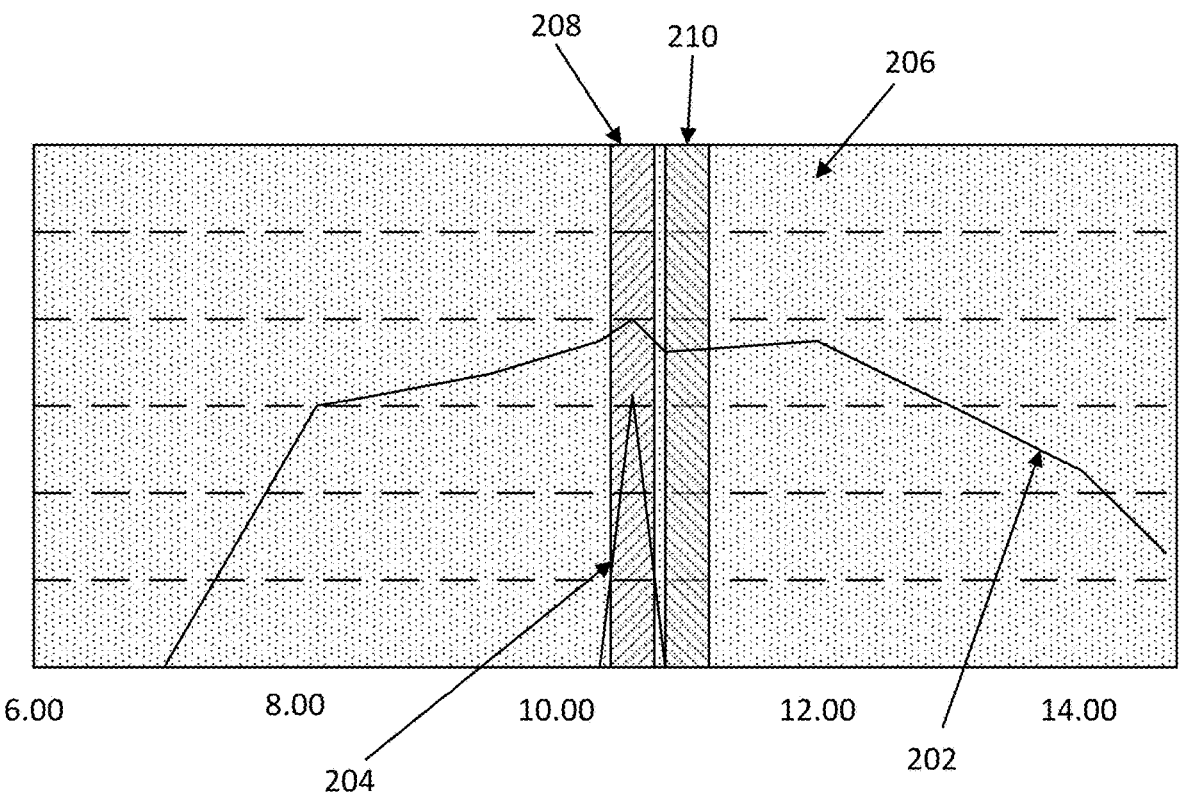
FIG. 3 illustrates a graph of radiance of an example scene acquired by an uncooled triple camera imaging system in accordance with an embodiment of the disclosure.

FIG. 3 illustrates a graph of radiance of an example scene acquired by an uncooled triple camera imaging system in accordance with an embodiment of the disclosure. The x-axis, y-axis, lines 202 and 204, and areas 206 and 208 of FIG. 3 may correspond to the respective axes, lines, and areas of FIG. 2. In the embodiment of FIG. 3, the areas 208 and 210 may represent wavelength bands of the electromagnetic spectrum that two narrowband cameras of an imaging system may be configured to image. The embodiment described in FIG. 3 may be, for example, an imaging system with three or more cameras with at least two narrowband cameras. Each of the narrowband cameras may be configured to image a narrow range of the electromagnetic spectrum. In a certain embodiment, the wavelength bands and/or ranges of one of the narrowband cameras may be centered on the wavelength and/or the peak of the waveband (i.e., the wavelength with the highest amount or quantity of electromagnetic radiation emitted or absorbed as shown by the peak of the line 204) of electromagnetic radiation emitted or absorbed by the gas being imaged. In such an embodiment, another one of the narrowband cameras may be configured to image ranges of the electromagnetic spectrum slightly above and/or below the wavelength and/or the peak of the waveband of electromagnetic radiation emitted or absorbed by the gas being imaged, though a plurality or all of the narrowband cameras of other embodiments may be configured to image ranges of the electromagnetic spectrum extending slightly above and/or below the wavelength and/or the peak of the waveband of electromagnetic radiation emitted or absorbed by the gas being imaged. In certain other embodiments, the electromagnetic spectrums imaged by the narrowband cameras may overlap the peak of the waveband of electromagnetic radiation emitted or absorbed by the gas being imaged.

Figure 4:
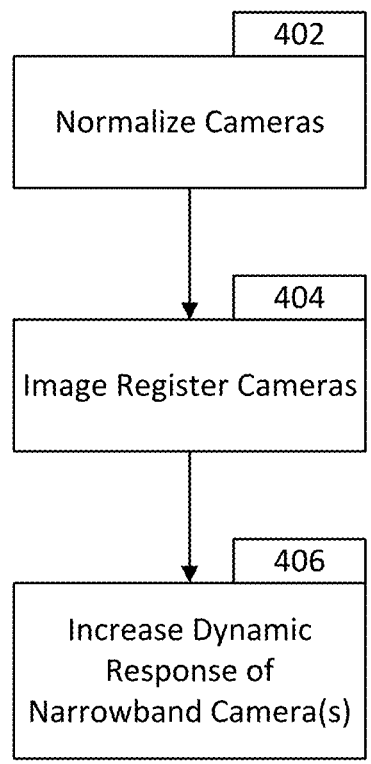
FIG. 4 illustrates a flowchart of a process of configuring an uncooled dual camera gas imaging system in accordance with an embodiment of the disclosure.

FIG. 4 illustrates a flowchart of a process of configuring an uncooled dual camera gas imaging system in accordance with an embodiment of the disclosure. The process described in FIG. 4 may be used to configure a multi-camera gas imaging system to detect presence of gas within an environment.

In block 402, the cameras of the imaging system are normalized. Accordingly, gain normalization may be configured within the cameras. For example, if a broadband camera has a dynamic range of 1,000 counts and a narrowband camera has a dynamic range of 80 counts, the ratio of broadband to narrowband dynamic range may be 12.5 to 1. After the ratio has been determined, the narrowband camera may be configured to apply a gain equal to the ratio may be applied to the pixel values of the image data from the narrowband camera(s). In other embodiments, the range of the broadband camera may be decreased to, for example, match the range of the narrowband camera or a combination of increasing the range of the narrowband camera and decreasing the range of the broadband camera may be configured. Other embodiments may not perform gain normalization and may, instead, adjust threshold or parameters used in image processing accordingly.

Also, image correction, such as flat field correction, of one or more cameras within the imaging system may be performed via, for example, an external shutter mechanism used to perform techniques such as flat field correction to reduce fixed pattern noise. Image correction may also be performed through other techniques, with other mechanisms, and/or may be performed through radiometrically calibrating the images captured by the cameras to reduce noise or non-uniformities.

In block 404, image registration may be performed on the broadband and narrowband cameras. In certain embodiments, the broadband and narrowband cameras may be boresighted using, at least in part, a collimator. Certain such embodiments may, for example, align the boresights of the plurality of cameras of an imaging system parallel to each other. The cameras may be boresighted to infinity. In other embodiments, image registration may be performed to align the pixels of the cameras. In certain embodiments, an affine transform may be used to co-register image streams (at, for example, the pixel levels) from the plurality of cameras (e.g., broadband and narrowband cameras) to reduce, non-uniformities, and/or misregistrations. The misregistrations may be due to, for example, distortions within a lens or lenses of the camera or cameras.

In block 406, the processing component may be configured and/or programmed to increase the dynamic response of one, some, or all of the narrowband camera(s). Such embodiments may, for example, increase the response of the narrowband camera to aid in the detection of gas within the scene. In other embodiments, the dynamic response of the broadband camera may be decreased or a combination of increasing the dynamic response of the narrowband camera and decreasing the dynamic response of the broadband camera may be configured.

Figure 5:
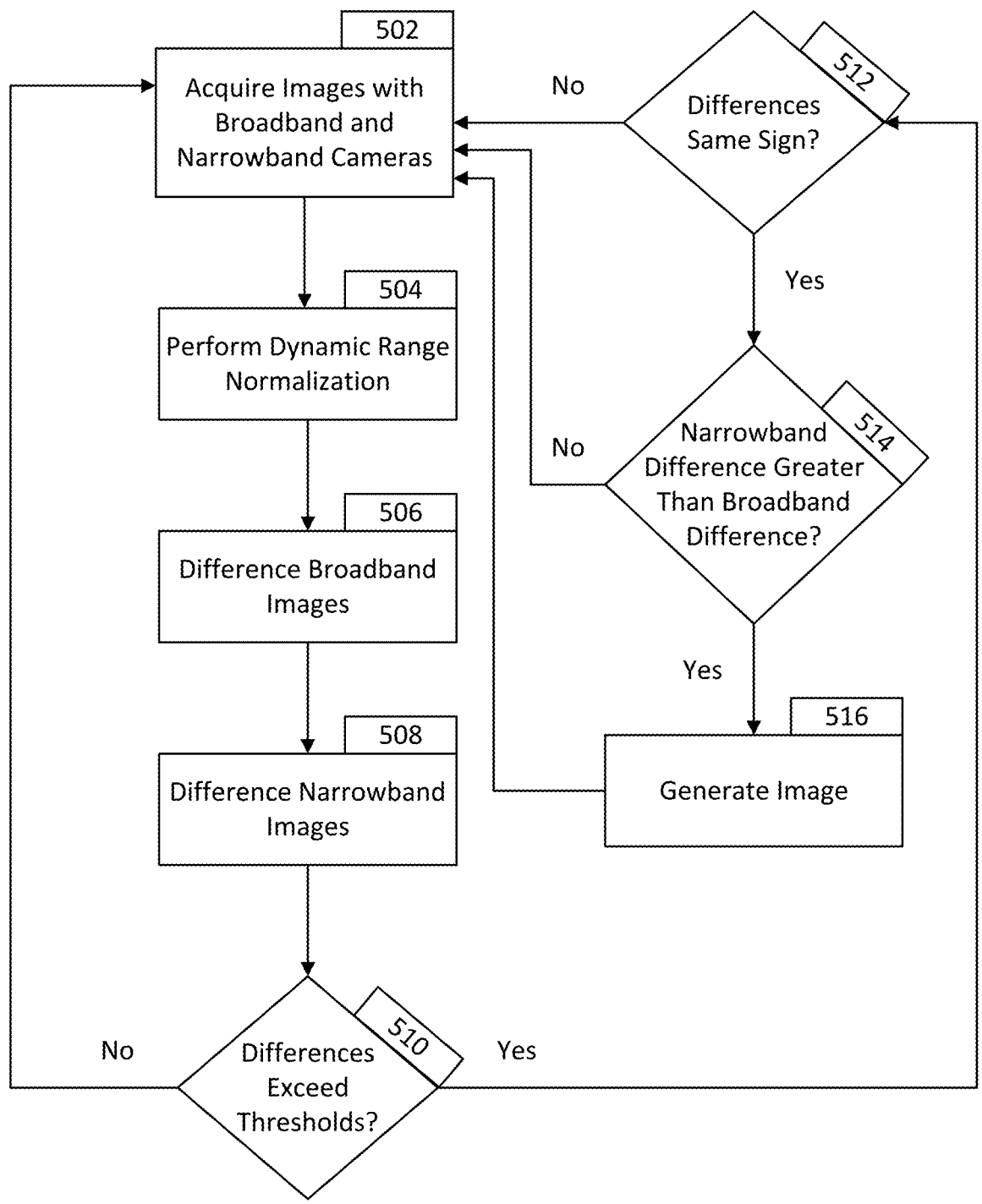
FIG. 5 illustrates a flowchart of a process of generating an image indicating a gas presence with an uncooled multi-camera gas imaging system in accordance with an embodiment of the disclosure.

FIG. 5 illustrates a flowchart of a process of generating an image indicating a gas presence with an uncooled multi-camera gas imaging system in accordance with an embodiment of the disclosure. The process illustrated in FIG. 5 may be performed by an imaging system that may include a plurality of cameras. At least one of the cameras may be a broadband camera and at least one of the cameras may be a narrowband camera. While FIG. 5 details a process performed in a certain sequence, it is appreciated that the process may also be performed in other sequences. As such, the blocks detailed in FIG. 5 may, in other embodiments, be performed in sequences other than the sequence described in FIG. 5.

In block 502, images and/or video may be acquired by the broadband and narrowband cameras. The broadband and narrowband cameras may acquire images and/or video substantially simultaneously. The broadband and narrowband cameras may acquire images and/or video of the same scene.

In block 504, dynamic range normalization may be performed on image data from the broadband and/or narrowband cameras. Dynamic range normalization may be performed to equalize the dynamic ranges and/or range offsets of the narrowband and broadband cameras such that the dynamic range of the narrowband and broadband cameras are equal or substantially equal. Dynamic range normalization may include, for example, determining a ratio of the dynamic range of image data from the broadband camera to image data of the narrowband camera. For example, if a broadband camera has a dynamic range of 1,000 counts and a narrowband camera has a dynamic range of 80 counts, the ratio of broadband to narrowband dynamic range may be 12.5 to 1. After the ratio has been determined, a gain equal to the ratio may be applied to the pixel values of the image data from the narrowband camera(s). Accordingly, for the current example, a gain of 12.5 may be applied to the pixel values of image data from the narrowband camera(s). After the gain has been applied, the offset of the dynamic ranges of the broadband and narrowband image data may be equalized. Such offset equalization may result in the dynamic ranges of the broadband and narrowband image values having the same minimum and maximum values. A variety of techniques may be used to perform offset equalization. Using the current example, the gain may be applied to the original minimum value of narrowband pixel values to create a modified minimum value. The modified minimum value may be subtracted from each of the narrowband pixel values that have been modified by applying the gain. The minimum value of the broadband pixel values may then be added to the modified narrowband pixel values. As such, both the narrowband and broadband dynamic ranges may be the same in value and may have the same offsets.

In certain other embodiments, alternative to or in addition to performing dynamic range equalization of the image data, the process may instead adjust the parameters used for the broadband image data, narrowband image data, and/or other image data. Accordingly, for example, the delta thresholds as described in block 510 may be different values for the image data of the broadband and narrowband cameras.

While the example described herein details adjusting the dynamic range and/or offset of image data from a narrowband camera to match the dynamic range and/or offset of image data from a broadband camera, other embodiments may adjust the dynamic range and/or offset of image data from a broadband camera to match the dynamic range and/or offset of image data from a narrowband camera or adjust the dynamic range and/or offset of image data from the broadband and narrowband cameras to match a third dynamic range and/or offset.

In block 506, a plurality of images and/or frames of video from the broadband camera may be differenced to obtain a broadband delta. In certain embodiments, an image and/or frame may be differenced and/or compared to a background image and/or frame (which may be, for example, generated from historical image data of the scene) though other embodiments may difference and/or compare the image and/or frame to a previous frame. Differencing may include determining the difference in pixel value for one, some, or all of the corresponding pixels of the plurality of images and/or frames. In certain embodiments, a broadband delta may be calculated from the comparison and/or difference. The delta may, in certain embodiments, be a value signifying the difference in pixel values or may be a differenced image where pixel values are determined from the differences between the compared pixels (e.g., between the current image and the background image).

In block 508, a plurality of images and/or frames of video from the narrowband camera may be differenced as well (from, for example, a background or previous image and/or frame) to create a narrowband delta. In embodiments of the imaging system where there are a plurality of narrowband cameras, a plurality of narrowband deltas may be calculated.

In certain embodiments, after the delta(s) have been determined, a spatial filter may be applied to one, some, or all of the broadband and/or narrowband deltas to lessen and/or minimize the effects of noise.

In block 510, the broadband and narrowband deltas may be compared to corresponding broadband and narrowband delta thresholds. In certain embodiments, a mask, such as a Boolean per-pixel mask, may be applied to each of the broadband and/or narrowband deltas. Additionally or alternatively, the deltas may be compared to one or a plurality of thresholds. In certain such embodiments with the plurality of thresholds, the various thresholds may increase in value (e.g., a first threshold may be a low value, a second threshold may be a higher value than the first threshold, and a third threshold may be a value higher than both the first and second thresholds) and the delta being equal to and/or higher than progressively higher thresholds may be associated with progressively higher gas concentrations. Also, in certain embodiments, an erode and dilation process may be performed to remove spurious detections. In embodiments where an erode and dilate process is used, the dilation kernel may be larger to avoid updating background models where there is the presence of gas. The results of applying the mask and/or the generating the kernel may be compared to broadband and narrowband delta thresholds. If the result of applying the mask and/or generating the kernel is greater than the thresholds, then the process may continue to block 512. If the results are lower than the threshold, the process may revert back to block 502 to process additional frames received.

In block 512, the signs of the broadband and narrowband deltas may be compared. The comparison may be performed, at least in part, by application of, for example, a pixel to pixel comparison, a mask, such as a Boolean per-pixel mask, applied to each of the broadband and/or narrowband deltas, or another technique. Additionally or alternatively, an erode and dilation process may be performed to remove spurious detections. In embodiments where an erode and dilate process is used, the dilation kernel may be larger to avoid updating background models where there is the presence of gas. If the signs of the results are the same, the process may continue to block 514. In examples where there is a presence of gas, the signs of the broadband and narrowband deltas may both increase or decrease as the presence of gas may concurrently increase or decrease an intensity of signals from the broadband and narrowband camera(s). If the signs of the comparisons are different, the process may revert back to block 502.

In block 514, the broadband and narrowband deltas are compared. The comparison may be performed, at least in part, by application of, for example, a pixel to pixel comparison (with one or a plurality of thresholds), a mask, such as a Boolean per-pixel mask, applied to each of the broadband and/or narrowband deltas, or another technique. Additionally or alternatively, an erode and dilation process may be performed to remove spurious detections. In embodiments where an erode and dilate process is used, the dilation kernel may be larger to avoid updating background models where there is the presence of gas. If the narrowband delta is greater than the broadband delta by a given threshold, the process may proceed to block 516. Otherwise, the process may revert to block 502.

In block 516, an image may be generated. Generation of the image may include defining a new mask. The new mask may, for example, be a Boolean mask. A background image may be generated with image data from the broadband camera and the mask may be applied to the image data from the broadband and/or narrowband camera(s). In certain embodiments, the mask may be applied to only regions of the image data where the presence of gas is determined and/or suspected to be. The mask may be used to create an overlay on the image to signify the presence of gas, though other embodiments may use other processes to create a background image with an overlay indicating the presence of gas. In certain embodiments, the overlay may be colorized to further aid in communication of the presence of gas to a viewer of the image. In certain such embodiments, the color of the colorization may be dependent on the concentration of gas detected. Accordingly, if a greater density of gas is detected (via, for example, a greater delta in the broadband and/or narrowband image data or a delta that may exceed a certain higher threshold), a first color (e.g., red) may be used, while if a lesser density of gas is detected (via, for example, a delta that may exceed a certain minimum threshold, but not a higher threshold), a second color (e.g., blue) may be used.

In certain embodiments, one, some, or all of the masks used during the process may be updated periodically. The mask(s) may be updated, for example, after a set amount of images or frames have been processed (e.g., 1 frame, between 2 to 10 frames, between 11 to 20 frames, or 21 or more frames). In certain such embodiments, the update rate of the mask(s) may be varied responsive to whether the presence of gas is detected or responsive to the concentration of gas detected. For example, the mask for portions of the image where no gas is detected may be updated at a faster rate than the mask for portions of the image where gas is detected. Other embodiments may update the mask(s) according to other logic.

Figure 6A:
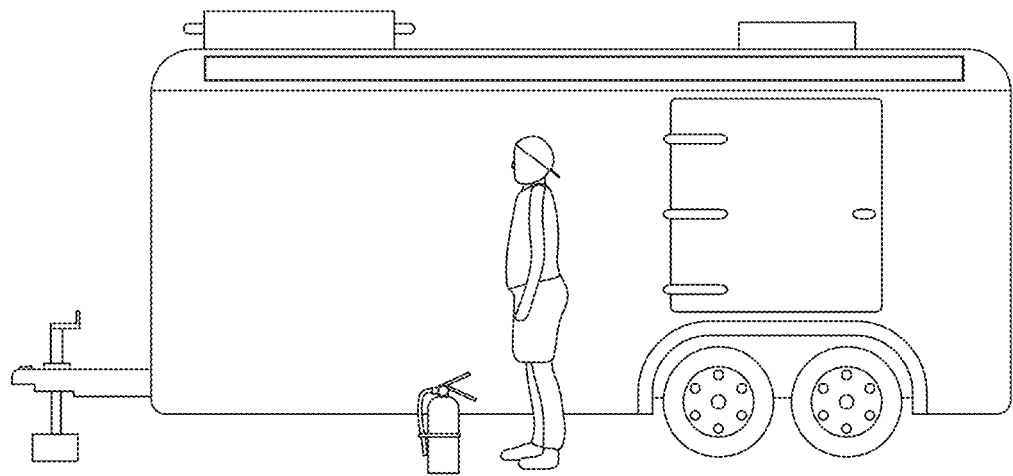
FIGS. 6A-D illustrate various images captured and/or processed by an imaging system in accordance with an embodiment of the disclosure.
Figure 6B:
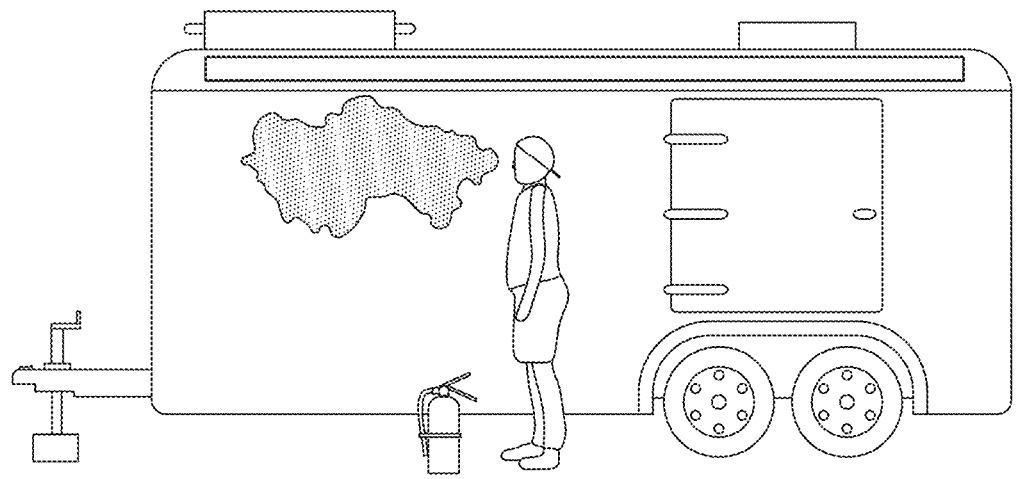
Figure 6C:
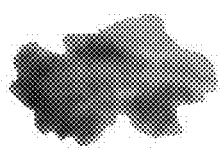
Figure 6D:
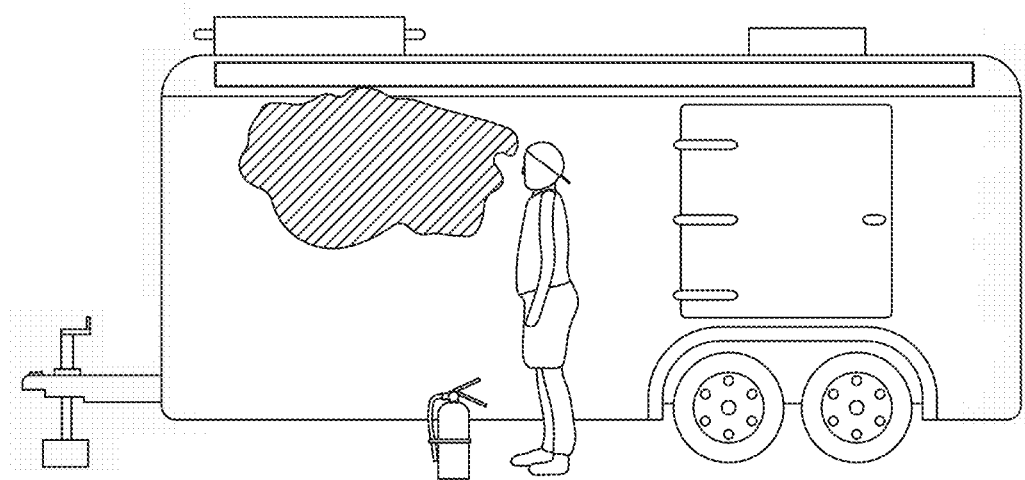

FIGS. 6A-D illustrate various images captured and/or processed by an imaging system in accordance with an embodiment of the disclosure. FIG. 6A may be an image generated from image data of a broadband camera. FIG. 6B may be an image generated from image data of a narrowband camera. FIG. 6C may be an image showing a difference between the images generated from the narrowband and broadband cameras. As shown in FIG. 6C, a presence of gas is visible. FIG. 6D shows an image with an overlay indicating the presence of gas. In certain embodiments, the overlay may be a color overlay. In such color overlays, various colors or shades may be used to distinguish between various concentrations of gases (that are detected by, for example, the differenced images meeting various thresholds).

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100A may be associated with a particular network link such as for example a URL (Uniform Resource Locator), an IP (Internet Protocol) address, and/or a mobile phone number.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An apparatus comprising:
   a first camera configured to acquire a plurality of first image frames of a scene in a broad wavelength band;
   a second camera configured to acquire a plurality of second image frames of the scene in a narrow wavelength band substantially simultaneous with the first camera; and
   a processing component communicatively connected to the first camera and the second camera and configured to perform a method comprising:
   comparing the first image frames to determine a broadband difference,
   comparing the second image frames to determine a narrowband difference,
   determining a presence of a gas within the scene using the broadband difference and the narrowband difference, and
   generating, with the first image frames and the second image frames, an image comprising a broadband representation of the scene and an indication of the presence of the gas.

2. The apparatus of claim 1, wherein the determining the presence of the gas within the scene comprises:
   determining that the broadband difference exceeds a first threshold;
   determining that the narrowband difference exceeds a second threshold;
   determining that signs of the broadband difference and the narrowband difference are the same; and
   determining that the narrowband difference is greater than the broadband difference.

3. The apparatus of claim 1, wherein:
   the comparing the first image frames comprises comparing corresponding pixels within the first image frames;
   the comparing the second image frames comprises comparing corresponding pixels within the second image frames; and
   wherein the first image frames and the second image frames are provided by the first and second cameras as first and second image data, respectively.

4. The apparatus of claim 2, wherein the method further comprises determining that the narrowband difference exceeds a third threshold to determine a concentration of the gas within the scene.

5. The apparatus of claim 1, wherein a first boresight of the first camera and a second boresight of the second camera are substantially aligned parallel to each other.

6. The apparatus of claim 1, wherein the method further comprises performing image registration of the first image frames and the second image frames.

7. The apparatus of claim 1, wherein the method further comprises performing, with the first image frames and/or the second image frames, an affine transform.

8. The apparatus of claim 1, wherein:
   the method further comprises increasing a gain of the second camera to match a dynamic range of the second image frames to a dynamic range of the first image frames; and
   the generating the image comprises using a difference between at least one of the first image frames and at least one of the second image frames.

9. The apparatus of claim 1, wherein the narrow wavelength band includes a wavelength absorbed by the gas.

10. The apparatus of claim 1, wherein the narrow wavelength band acquired by the second camera is a second camera narrow wavelength band and the apparatus further comprises a third camera configured to acquire a plurality of third image frames of the scene in a third camera narrow wavelength band substantially simultaneous with the first camera, wherein the generating comprises generating the image with the third image frames.

11. The apparatus of claim 10, wherein the second camera narrow wavelength band includes a wavelength absorbed by the gas and the third camera narrow wavelength band is at least partially above or below the second camera narrow wavelength band.

12. The apparatus of claim 1, wherein the second camera comprises a filter configured to filter at least the scene to the narrow wavelength band.

13. The apparatus of claim 1, wherein the first camera and/or the second camera are uncooled microbolometer based cameras.

14. The apparatus of claim 1, wherein the gas presence indication is overlaid on the broadband representation of the scene.

15. The apparatus of claim 1, further comprising a mount coupled to the first camera and the second camera and configured to hold the first camera at a fixed distance from the second camera.

16. A method comprising:
acquiring first image frames of a scene in a broad wavelength band from a first camera;
acquiring second image frames of the scene in a narrow wavelength band from a second camera;
comparing the first image frames to determine a broadband difference;
comparing the second image frames to determine a narrowband difference;
determining a presence of a gas within the scene using the broadband difference and the narrowband difference; and
generating, with the first image frames and the second image frames, an image comprising a broadband representation of the scene and an indication of the presence of the gas.

17. The method of claim 16, wherein the determining the presence of the gas within the scene comprises:
determining that the broadband difference exceeds a first threshold;
determining that the narrowband difference exceeds a second threshold;
determining that signs of the broadband difference and the narrowband difference are the same; and
determining that the narrowband difference is greater than the broadband difference.

18. The method of claim 16, wherein:
the comparing the first image frames comprises comparing corresponding pixels within the first image frames;
the comparing the second image frames comprises comparing corresponding pixels within the second image frames; and
wherein the first image frames and the second image frames are provided by the first and second cameras as first and second image data, respectively.

19. The apparatus of claim 2, wherein the processing component is configured to apply one or more Boolean masks to:
determine that the broadband difference exceeds the first threshold;
determine that the narrowband difference exceeds the second threshold;
determine that signs of the broadband difference and the narrowband difference are the same;
determine that the narrowband difference is greater than the broadband difference; and/or
generate the image.

20. The method of claim 17, comprising applying one or more Boolean masks to:
determine that the broadband difference exceeds the first threshold;
determine that the narrowband difference exceeds the second threshold;
determine that signs of the broadband difference and the narrowband difference are the same;
determine that the narrowband difference is greater than the broadband difference; and/or generate the image.

* * * * *